United States Patent [19]
Cook

[11] 3,944,247
[45] Mar. 16, 1976

[54] DOUBLE TRACK BAR SYSTEM

[76] Inventor: Charles E. Cook, 1800 Pasadena Ave., Los Angeles, Calif. 90031

[22] Filed: Nov. 19, 1973

[21] Appl. No.: 416,951

[52] U.S. Cl.......... 280/124 R; 180/73 TL; 267/20 R
[51] Int. Cl.²........................................... B60G 9/04
[58] Field of Search............ 280/124 R; 180/73 TL; 267/20 R

[56] References Cited
UNITED STATES PATENTS
| | | | |
|---|---|---|---|
| 2,309,811 | 2/1943 | Utz | 267/20 R |
| 3,231,040 | 1/1966 | Blanchette | 180/73 |

*Primary Examiner*—Philip Goodman
*Attorney, Agent, or Firm*—Lyon & Lyon

[57] ABSTRACT

A suspension system for a motor vehicle having a rigid axle supporting the vehicle on coil springs located at either end thereof. Trailing radius arms prevent forward and aft movement of either end of the axle relative to the vehicle and symetrically mounted track bars constrain the axle to move vertically without significant lateral motion. The track bars of the present system operate together to reduce the arcuate movement induced by single track bars in conventional rigid axle suspension systems. Flexible axle mounting brackets enhance the effect of these various rigid links.

7 Claims, 5 Drawing Figures

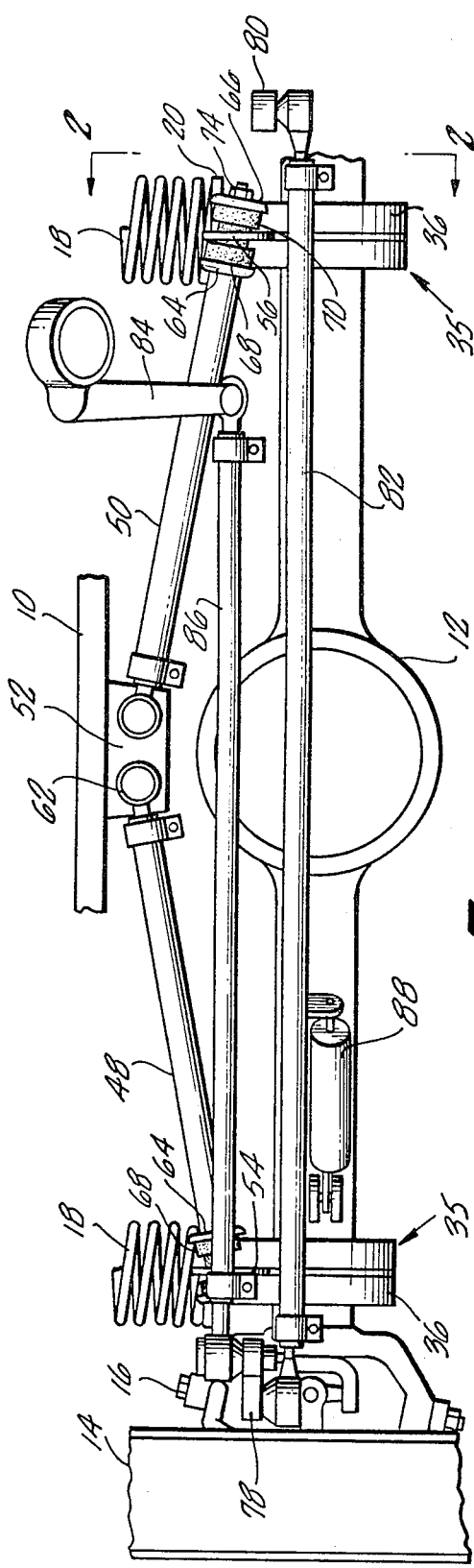
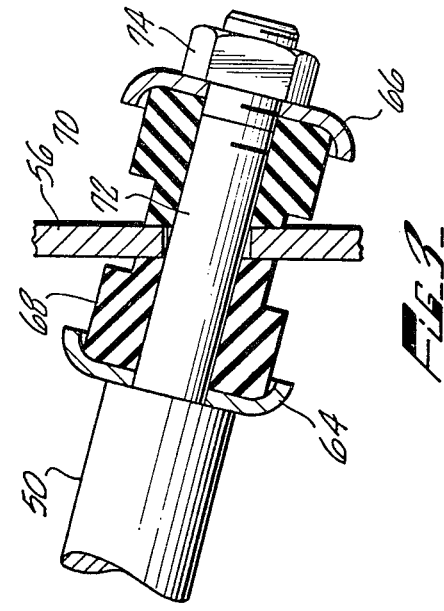
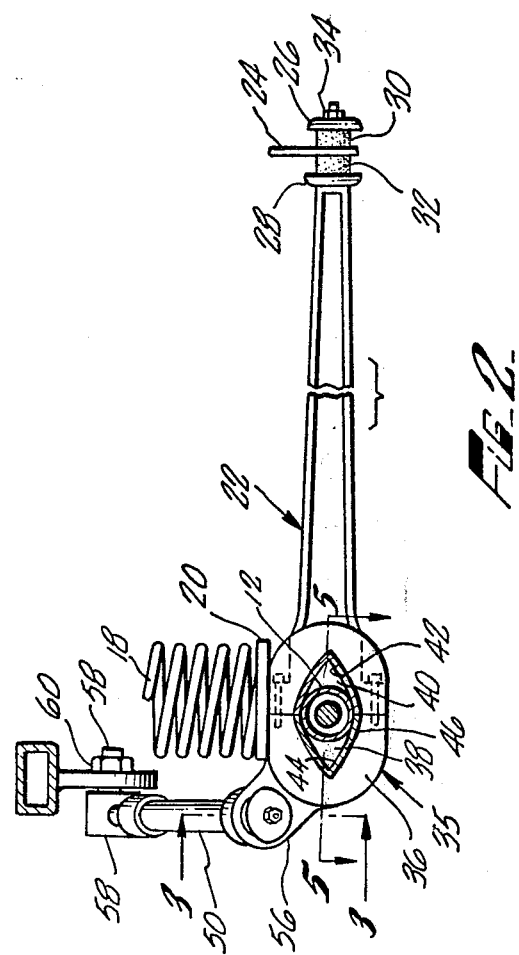

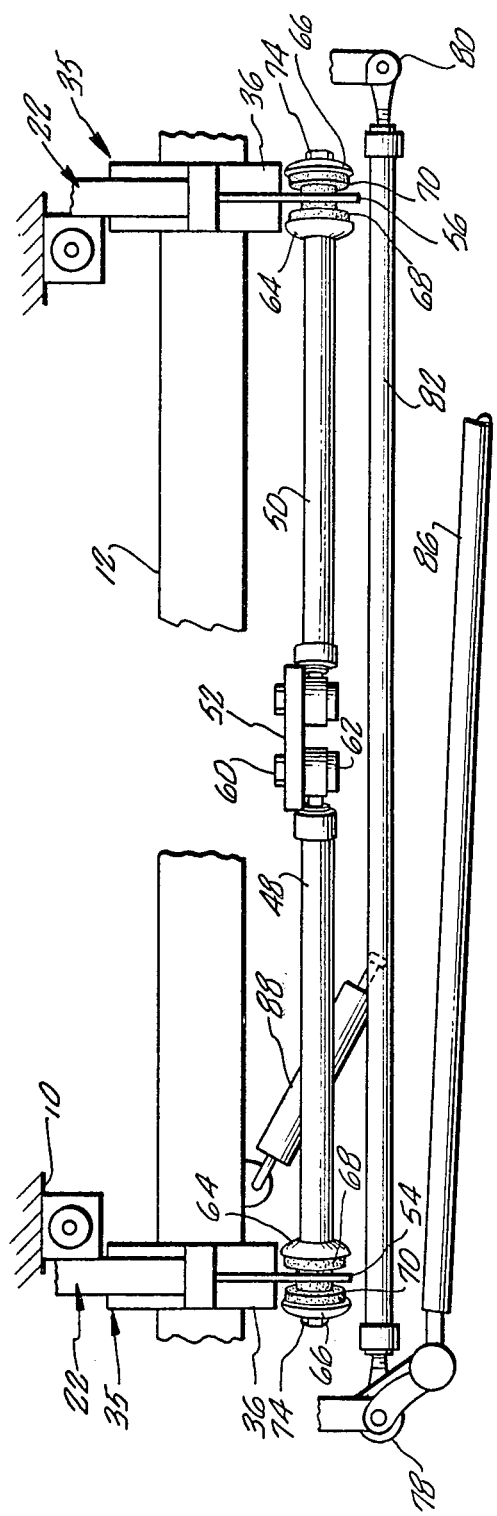
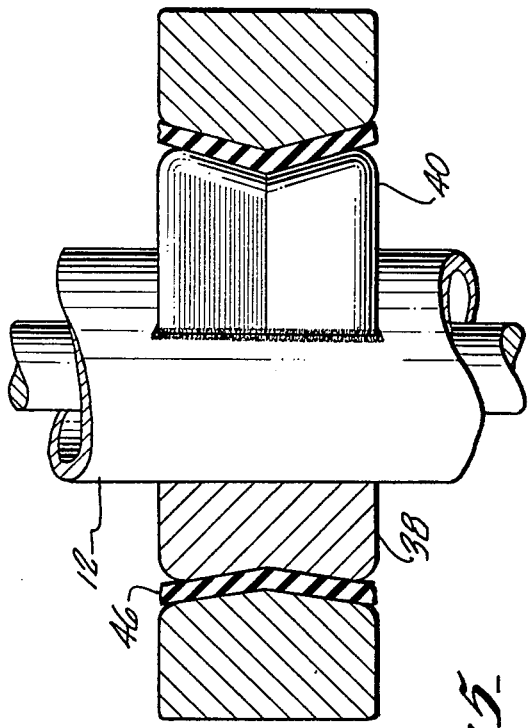

DOUBLE TRACK BAR SYSTEM

The invention is directed to a suspension system for a motor vehicle. More specifically, this invention is directed to a multiple track bar suspension system employed with a rigid axle.

Spring suspension systems associated with rigid axles have been employed on a wide variety of vehicles. Such systems have been found to be of practical merit as the front suspension for four-wheel drive vehicles. However, certain problems are inherent in such systems because of the nature and configuration of the various springs employed. Specifically, coil springs provide a wide range of spring rates and deflection characteristics but they generally do not provide substantial lateral rigidity. Leaf springs provide greater lateral stability than coil springs but still allow objectionable lateral movement. Consequently, it is necessary to constrain the rigid axle by other than the lateral restoring forces of the springs.

Pivotally mounted rigid arms located in a variety of positions have been employed to stabilize rigid axles with respect to a variety of vehicles. Such rigid arms constrain the motion of rigid axles to an arc of a circle having a radius of curvature equal to the length of the arm employed. This creates relative arcuate movement of the suspension at the end of the arm. This arcuate movement translates at the road into fore and aft or lateral movement relative to the frame resulting in a loss of handling and traction. To reduce this induced movement, it has been a common solution to make each arm as long as possible. The detrimental effect of this arcuate movement is most prevalent in the lateral direction. Consequently, single rigid arms or track bars have been employed in many rigid axle suspension systems which extend laterally across the vehicle from the frame on one side to the rigid axle on the other.

The present apparatus includes two track bars positioned laterally across the vehicle. These bars are attached to opposite ends of the rigid axle and extend inwardly to the frame. The bars symetrically oppose one another to reduce the effect of the arcuate movement of each bar on the rigid axle. The mounting brackets associated with the bars provide the necessary flexibility to allow linear vertical travel of the rigid axle at either end thereof. Consequently, the present invention alleviates the problems associated with the relative lateral motion induced by the single track bar, specifically on four-wheel drive vehicles where traction and handling over rough terrain is essential. The present apparatus further includes extended radius arms associated with the same flexible axle mounting system which controls fore and aft movement of the rigid axle.

In conjunction with the improved relative movement between the rigid axle and the frame fostered by the present invention, the steering mechanism is optimized through careful placement of the drag link. Arcuate movement of the drag link similar to that experienced by rigid suspension arms tends to detrimentally affect steering. Horizontal placement of the drag link, as in the present invention, tends to minimize this effect.

Accordingly, it is an object of the present invention to provide a suspension system for a motor vehicle wherein a rigid axle is constrained to move vertically relative to the vehicle.

Another object of the present invention is to provide a suspension system for a motor vehicle having a rigid axle wherein two symetrically opposed track bars cooperate to limit lateral motion of the rigid axle.

A further object of the present invention is to provide a system for preventing horizontal movement of a rigid axle suspension system relative to the associated vehicle where multiple rigid arms are employed in association with flexible axle mounting brackets.

Other objects and advantages will become apparent from the description herein.

FIG. 1 illustrates the suspension system of the present invention in association with a rigid axle and coil springs.

FIG. 2 is a cross-sectional view taken along line 2—2 of FIG. 1.

FIG. 3 is a detailed cross-sectional view of one of the outer brackets of the track bar system taken along line 3—3 of FIG. 2.

FIG. 4 is a top view of the present invention with the springs removed for clarity.

FIG. 5 is a detailed cross-sectional view of one mounting bracket taken along line 5—5 of FIG. 2.

Turning specifically to the drawings, a suspension system according to the present invention is disclosed. A frame 10 of the motor vehicle is illustrated at locations where the suspension system is attached thereto. The frame 10 is considered to be a rigid assembly to which the suspension components are attached. A rigid axle 12 is also illustrated which extends across the underside of the frame 10 to rotatably support wheels 14 at either end thereof outboard of the king pin assemblies 16. The primary suspension elements supporting the vehicle 10 above the rigid axle 12 are coil springs 18 in the present embodiment. These springs are rigidly held by mounting plates 20 at either end of the rigid axle 12. Similar conventional mounting means are provided on the frame 10.

The basic spring system, including the frame 10, the rigid axle 12 and the springs 18, does not provide substantial rigidity against motion of the rigid axle 12 relative to the frame 10 of the vehicle in a horizontal plane. Consequently, constraining mechanisms must be employed which physically limit this relative horizontal motion. When this motion is not prevented, the vehicle may take on unstable handling characteristics which are both unsafe and annoying.

To prevent substantial fore and aft motion of the rigid axle 12, constraining linkage is provided. Radius arms, generally designated 22, are employed to constrain the axle. Each arm 22 has a link between the rigid axle 12 and the frame 10 which is not subject to substantial compressive or tensile movement. Consequently, the ends of the axle 12 are constrained by the radius arms 22 to move in curved, substantially vertical planes having radiuses of curvature equal to the lengths of the two radius arms 22. The curvature of this locus of axle movement is of little consequence because it only allows a minimum of fore and aft motion to the axle. A limited amount of fore and aft movement is easily accommodated by the suspension in this direction. The radius arms 22 are also mounted approximately horizontal to further reduce any effect of the arcuate fore and aft motion on handling.

The radius arms 22 are fixed to the frame 10 at brackets 24 rigidly welded to the frame 10. Curved washers 26 and 28 are positioned on either side of rubber bushings 30 and 32. A nut 34 then retains the etire assembly and the radius arm 22 at the bracket 24. This bracket assembly fixes the radius arm to the frame in such a way that limited pivotal motion of the radius arm 22 relative to the frame 10 is tolerated. However, fore and aft movement of the radius arm 22 relative to the frame 10 is greatly restrained.

The forward end of each radius arm 22 is locked about the rigid axle 12 as can best be seen in FIG. 2 and FIG. 5. Flexible axle mounting brackets, generally designated 35, are created by the radius arms 22 in conjunction with two end caps 36 bolted thereto. Each of these mounting brackets 35 cooperate with two triangular ears 38 and 40 to effectively constrain axle movement relative to the respective radius arm 22. To receive the triangular ears 38 and 40, large notches 42 and 44 are provided in the mating surfaces of each radius arm 22 and each end cap 36. The triangular ears 38 and 40 are welded near either end of the rigid axle 12 on opposite sides thereof. Flexible mounting material 46 such as rubber is wrapped about the triangular ears 38 and 40 and the interposed portions of the rigid axle 12. The radius arms 22 and end caps 36 are then bolted together about the flexible mounting material 46 to complete the axle mounting brackets 35. Because of the use of flexible mounting material 46, the notches 42 and 44 should be slightly larger than the respective triangular ears 38 and 40. The use of the flexible mounting material 46 effects attenuation of noise and vibration without allowing significant fore and aft movement of the rigid axle 12 relative to the radius arms 22 and in turn the frame 12.

Lateral control of the rigid axle 12 relative to the radius arms 22 is also provided by the axle mounting brackets 35. Each ear 36 and 38 is formed to define grooved outer surfaces. These grooves form concavities extending substantially the width of each ear which cooperate with corresponding convex surfaces formed on the notched surfaces of the radius arms 22 and the end caps 36. This relationship is best seen in FIG. 5. The respective concave and convex mating surfaces of the ears 36 and 38 and the notches 42 and 44 create an interlocking fit between the rigid axle 12 and the radius arms 22. However, the presence of the flexible mounting material 46 and the accommodating tolerance between the ears and the notches allows some relative movement between the radius arms 22 and the rigid axle 12. This relative movement is somewhat greater than the relative fore and aft movement allowed by the same mounting brackets. This more flexible lateral constraint of the brackets is employed to advantage by the means for laterally constraining the rigid axle as will be discussed below. At the same time, comparatively rigid fore and aft constraint is transmitted by the mounting brackets 35.

Unlike the minimal fore and aft movement of the suspension, lateral movement of the rigid axle 12 relative to the frame 10 is easily felt by the driver and more seriously affects the operation of the vehicle. To prevent the relative lateral motion of the rigid axle 12 relative to the vehicle 10, means for laterally constraining the rigid axle are employed. These means include opposed track bar assemblies. The track bar assemblies include track bars 48 and 50 shown to be identical and mounted at one end by pivot assemblies to a bracket 52 rigidly associated with the frame 10. At the other end, the bars 48 and 50 are mounted by resilient mounting assemblies to brackets 54 and 56 which are in turn welded to the axle mounting brackets 35, specifically the end caps 36. In the preferred embodiment, the bars 48 and 50 are rigid to prevent bending and longitudinal compression or tension movement thereof. The flexibility necessary to the system is then provided by the resilient mounting assemblies and lateral movement of the axle mounting brackets 35. Alternately, the resiliency of the resilient mounting assemblies may be incorporated in the bars 48 and 50 themselves in which case the outer mounting assemblies may be of a more rigid nature. The track bars 48 and 50 are oriented as shown with the pivot assemblies on the frame and the resilient mounting assemblies associated with the axle. However, this configuration may be altered so the pivot assemblies are mounted to the rigid axle and the resilient mounting assemblies are associated with the vehicle frame if desired.

The track bars 48 and 50 are identically mounted to the mounting bracket 52 by the pivot assemblies. A ball and taper pin 58 are bolted by means of nut 60 to the bracket 52 for each track bar. A socket 62 is provided on each track bar 48 and 50 to mount over the ball and taper pin 58. Thus, the track bars 48 and 50 are constrained to rotate about the center of curvature of the balls 58 and are prevented from moving laterally. Thus, the outer ends of the track bars 48 and 50 are constrained to move in arcuate paths having a radius of curvature equal to the length of the track bars 48 and 50 and centers of curvature located at each respective ball and taper pin 58.

The outer ends of the track bars 48 and 50 are mounted to the brackets 54 and 56, as best seen in FIG. 3, by resilient mounting assemblies. Curved retaining caps 64 and 66 are positioned on either side of bushings 68 and 70 respectively. The bushings 68 and 70 are in turn positioned on either side of the brackets 54 and 56. The diameter of the rod 50 is reduced at 72 to receive the cap 64 which prevents its longitudinal movement along the track bar 50. The end of the track bar 50 is threaded at 72 to receive nut 74 which positions the cap 66. The rubber bushings 68 and 70 are compressible to allow limited longitudinal movement of the track bar 50 relative to the bracket 56 through a mounting hole 76.

Considering both track bars 48 and 50, a structural triangle is formed by these bars and the rigid axle 12. As the rigid axle is driven upward, the two track bars 48 and 50 are forced outward; and likewise, when the axle drops, the bars are drawn inward. However, the rigid axle 12 is not capable of expanding. Consequently, the track bar assemblies and/or the rigid axle mounting brackets 35 must be extensible. In the present embodiment, the track bars 48 and 50 move substantially longitudinally along their centerlines through the brackets 54 and 56 as the rigid axle moves up or down. This relative movement is experienced and resisted by the bushings 68 and 70. The bushings are not able to provide substantial resistance to this vertical motion of the rigid axle 12 because of the relative mechanical advantage of the vertically moving rigid axle 12. At the same time, lateral motion of the rigid axle 12 is directly experienced by the bushings 68 and 70 and substantial resistance is presented. Consequently, the vertical motion of the rigid axle 12 is not substantially resisted by the track bars 48 and 50 but lateral motion is strongly resisted by each of the track bars 48 and 50. The length and placement of the track bars 48 and 50 does affect the resistance to vertical movement. When the track bars are long, there is little resistance to vertical movement. However, the length of the bars does not affect their ability to laterally control the axle. Consequently, each bar may extend all of the way across the frame where desired.

The relative lateral motion of the track bars 48 and 50 is also accommodated by the rigid axle mounting brackets as well as the bushings 68 and 70. As discussed above, the rigid axle mounting brackets provide some degree of lateral motion relative to the rigid axle 12. Thus, the arcuate movement of the outer ends of the track bars 48 and 50 induced by the vertical movement of the rigid axle is accommodated by both the bushings 68 and 70 and the rigid axle mounting brackets. This movement is not prevented by the resistance of these several mounting components because of the mechanical advantage realized by the vertical motion of the rigid axle 12 through the track bars 48 and 50. At the same time, the actual lateral motions of the rigid axle 12 directly induced by the road do not experience any mechanical advantages against the several mounting components and consequently are more severly resisted. The springs 18 are also mounted directly to the rigid axle mounting brackets. The lateral movement of these brackets to accommodate the arcuate motion of the track bars does not affect to any significant degree the springs or their effect.

Because of the symetrical placement of the track bars 48 and 50, the bars tend to cooperate to prevent the rigid axle from moving along the plane of curvature associated with the end of either bar 48 and 50. As the rigid axle 12 moves upward, both track bars 48 and 50 exert compression loads against the brackets 54 and 56 in substantially opposite directions. The bushings 68 and 70 tend to deform equally to cause a truly vertical travel of the rigid axle 12. Consequently, the curved path normally associated with a single track bar is overcome and handling and stability are improved.

The steering system employed by the present invention includes conventional king pin assemblies 16 which extend forward to steering knuckles 78 and 80. The steering knuckles are joined by a tie rod 82. The steering knuckles are positioned relative to the king pin axes so that the steering is more parallel rather than geometrical. This has been found to be advantageous on certain vehicles tested with the present embodiment. However, empirical analysis is believed necessary for other vehicle configurations having variations in suspension and body geometry and steering characteristics. Steering control is derived from the steering box through a pitman arm 84 and a drag link 86. The drag link 86 is disposed substantially horizontally to reduce the effect of vertical movement of the rigid axle 22. A shock absorber 88 is positioned between the frame 10 and the tie rod 82 to act as a steering stabilizer. The shock absorber 88 does not resist controlled steering motion but does resist the sharp shock impulses against the wheels which would otherwise cause adverse steering motions.

Working as a unit, the suspension system includes two trailing radius arms 22 which control the fore and aft motion of the rigid axle and two track bars 48 and 50 to control lateral movement of the axle. These various rigid bars cooperate through axle mounting brackets 35 to properly resist lateral and fore and aft movement of the axle relative to the frame without significantly restricting vertical movement. The springs 16 and 18 restrict vertical movement. Conventional shock absorbers (not shown) are also preferably employed to damp the resulting spring mass system. Thus, the present embodiment operates to stabilize the rigid axle relative to the frame of the vehicle. The steering system also operates to minimize the effect of vertical axle movement on steering control.

While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A suspension system for a rigid axle on a motor vehicle comprising
   springs operably mounted between the vehicle and the rigid axle;
   constraining linkage preventing substantial fore and aft movement of the rigid axle; and
   a pair of opposed track bar assemblies for preventing lateral movement of the axle relative to the frame of the vehicle, each of said track bar assemblies being mounted as a first end to the frame of the vehicle and mounted at a second end to the axle, said assemblies being extensible to accomodate vertical axle movement, a first one of said pair of opposed track bar assemblies being attached near one end of the rigid axle and a second one of said pair of opposed track bar assemblies being attached near the other end of the rigid axle, said pair of opposed track bar assemblies extending inwardly therefrom to the frame of the vehicle.

2. The suspension system of claim 1 wherein said track bar assemblies include track bars and resilient mounting assemblies associated with one end of each of said track bars, each of said resilient mounting assemblies allowing resilient longitudinal movement of said track bars relative to the axle.

3. The suspension system of claim 1 wherein said system further comprises a pair of axle mounting brackets, each one of said pair of axle mounting brackets being attached near the ends of the rigid axle, said pair of opposed track bar assemblies each being attached at one end to one of said pair of axle mounting brackets and said axle mounting brackets being capable of moving laterally on the rigid axle to accommodate movement of said pair of opposed track bar assemblies resulting from the vertical movement of said rigid axle.

4. The suspension system of claim 3 wherein said springs, said constraining linkage and said pair of opposed track bar assemblies are all mounted at one end to said pair of axle mounting brackets.

5. The suspension system of claim 3 wherein said axle mounting brackets are unitary with said constraining linkage.

6. A suspension system for a rigid axle on a motor vehicle comprising
   coil springs operably mounted between the vehicle and the rigid axle;
   trailing radius arms resiliently mounted at one end to the frame of the motor vehicle and resiliently mounted at the other end to the rigid axle;
   a pair of opposed track bars for preventing lateral movement of the axle relative to the frame of the vehicle;
   pivot assemblies operably fixing one end of each of said track bars to the frame of the vehicle;
   mounting assemblies associated with a second end of each said track bars and positioned near the opposite ends of the axle, each of said mounting assemblies allowing resisted longitudinal movement of said track bars relative to the axle, said pair of opposed track bars extending inwardly from said mounting assemblies to the frame of the vehicle.

7. A suspension system for a rigid axle on a motor vehicle comprising springs operably mounted between the vehicle and the rigid axle;

axle mounting brackets positioned near either end of the rigid axle, said axle mounting brackets being capable of resilient movement laterally on the rigid axle;

radius arms resiliently mounted to said frame and structurally forming part of said axle mounting brackets, said radius arms preventing substantial fore and aft movement of the rigid axle;

a pair of opposed track bars for preventing lateral movement of the axle relative to the frame of the vehicle;

pivot assemblies operably fixing one end of each of said track bars to the frame of the vehicle;

resilient mounting assemblies associated with a second end of each of said track bars and resiliently mounted to said axle mounting brackets, each of said resilient mounting assemblies allowing resisted longitudinal movement of said track bars relative to said axle mounting brackets, said pair of opposed track bars extending inwardly from said resilient mounting assemblies to the frame of the vehicle.

* * * * *